Nov. 8, 1927.

W. M. FULTON 1,648,046

TUBULAR CORRUGATED WALL AND METHOD OF MAKING THE SAME

Filed May 26, 1921   3 Sheets-Sheet 1

Inventor
Weston M. Fulton,
By Mauro, Cameron, Lewis & Massey
Attorneys

Nov. 8, 1927. 1,648,046
W. M. FULTON
TUBULAR CORRUGATED WALL AND METHOD OF MAKING THE SAME
Filed May 26, 1921   3 Sheets-Sheet 2

Inventor
Weston M. Fulton,
By Mauro, Cameron, Lewis & Kerkam
Attorneys

Nov. 8, 1927. 1,648,046
W. M. FULTON
TUBULAR CORRUGATED WALL AND METHOD OF MAKING THE SAME
Filed May 26, 1921 3 Sheets-Sheet 3
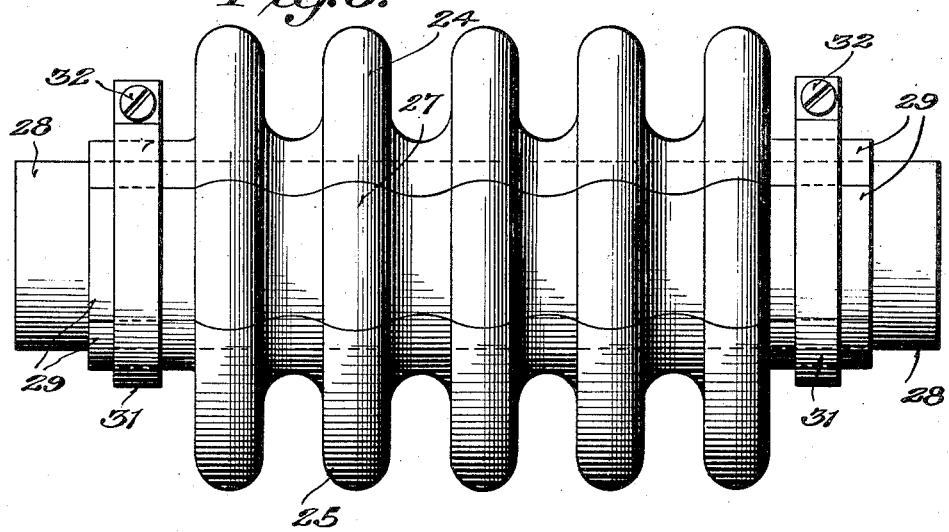
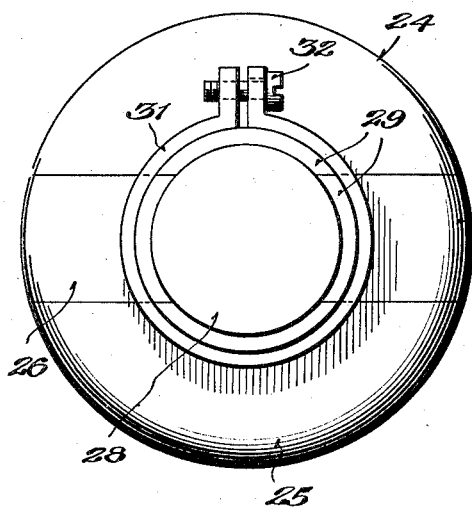
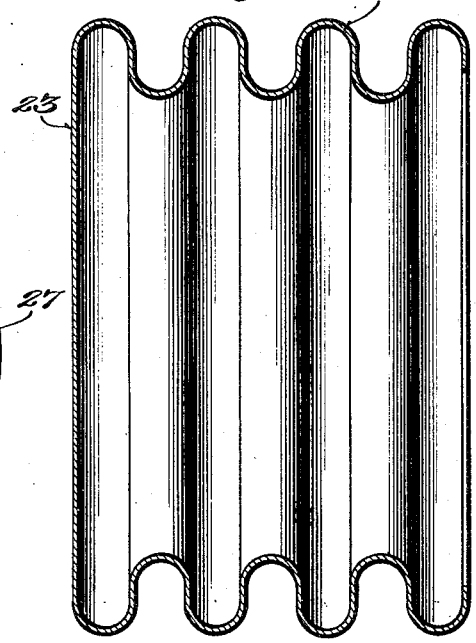

Patented Nov. 8, 1927.

1,648,046

UNITED STATES PATENT OFFICE.

WESTON M. FULTON, OF KNOXVILLE, TENNESSEE, ASSIGNOR TO THE FULTON SYLPHON COMPANY, OF KNOXVILLE, TENNESSEE, A CORPORATION OF DELAWARE.

TUBULAR CORRUGATED WALL AND METHOD OF MAKING THE SAME.

Application filed May 26, 1921. Serial No. 472,931.

This invention relates to flexible tubular corrugated walls and methods and apparatus for making the same.

In order that a tubular corrugated wall shall most satisfactorily withstand repeated flexure or extension and contraction for a relatively great number of times without rupture, experience has demonstrated that it should have no brazed or soldered seam or joint in its flexible portion. It is an object of this invention to provide a novel method of making flexible corrugated tubular walls that are seamless.

Electrically deposited metal is relatively soft and pliable and of relatively low elasticity, so that it is readily stressed beyond its elastic limit and, therefore, ruptures within a comparatively short time under repeated flexure. It is an object of this invention to provide a flexible tubular corrugated wall of electrically deposited metal which is possessed of resilience and a relatively high elastic limit, so that it is strong and durable and capable of repeated flexure without rupture.

Electrically deposited metal is relatively spongy and porous so that it is incapable of retaining certain gases and vapors through long periods of time without gradual seepage through the pores of the wall. It is an object of this invention to provide a flexible tubular corrugated wall of electrically deposited metal which is relatively dense so that it is capable of containing gases and vapors through long periods of time without leakage of the same.

Commercial tubular corrugated walls of the type under consideration generally possess relatively deep corrugations in order to provide the requisite flexibility and, at the same time, said corrugations are generally made relatively narrow so that liquid of condensation may be retained between their folds by capillary action. If a core or mold be made with a corrugated surface of the character desired in the completed wall, it is relatively difficult to secure a good electrically-conductive surface in the relatively deep and narrow recesses provided by said corrugations. It is an object of this invention to provide a method of making a flexible tubular corrugated wall of electro-deposited metal which employs a core or mold having relatively wide and shallow corrugations so that if said core or mold is made of electrically non-conductive material, it is relatively easy to secure a uniform coating of conductive material in the recesses of the corrugated surface, and if the core or mold is made of electrically conductive material it is relatively easy to clean the conductive surfaces, and so that in either case a uniform deposit of metal and a corrugated wall of substantially uniform thickness may be secured, and furthermore so that the core or mold will have relatively short, wide projections which are relatively strong and not easily injured in handling.

Another object of this invention is to provide a flexible tubular corrugated wall of electro-deposited metal which may have different predetermined thicknesses at different portions thereof.

Another object of this invention is to provide a flexible tubular corrugated wall of electro-deposited metal which may have different degrees of resilience in different portions thereof.

Another object of this invention is to provide a method of making flexible tubular corrugated walls of electro-deposited metal which includes the cold-working of the metal so as to enable the desired physical characteristics to be readily imparted thereto and, particularly, so as to facilitate the imparting of resilience to the bends of the corrugations.

Another object of this invention is to provide a method of making flexible tubular corrugated walls of electro-deposited metal which materially decreases the amount of waste incident to the methods heretofore employed and which therefore substantially reduces the cost of manufacturing such walls.

Other objects will appear as the description of the invention proceeds.

Stated broadly, the invention comprises a flexible tubular corrugated wall of electro-deposited metal which has been cold-worked so as to impart the desired physical characteristics thereto, and a method of making such a wall which comprises forming a blank by electro-deposition and subjecting the same to cold-working operations, preferably while forming corrugations of the desired width and depth therein.

The invention is capable of being carried out in a variety of ways some of which are illustrated on the accompanying drawings, but it is to be expressly understood that the drawings are for purposes of illustration only and are not to be construed as a definition of the limits of the invention, reference being had to the appended claims for that purpose.

In said drawings:—

Fig. 6 is a side view of a collapsible core which may be employed in the present invention;

Fig. 7 is an end view of the core shown in Fig. 6; and

Fig. 8 is an axial section of a tubular corrugated wall and illustrates an end wall formed integrally therewith.

Figure 1:
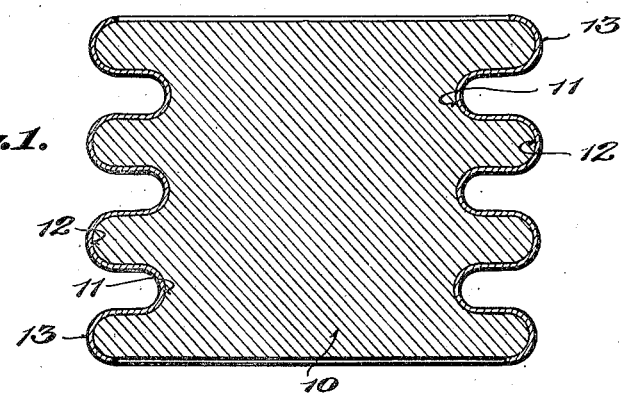
Fig. 1 is a diagrammatic view showing in axial section a core having a tubular corrugated surface provided with relatively wide and shallow corrugations in conformity with the present invention and having a wall of electro-deposited metal formed thereon.

In the preferred embodiment of the present invention a core or mold is formed with a tubular corrugated surface the corrugations of which are relatively wide and shallow. Said core or mold may be made of any suitable material, such as any suitable electrically non-conductive material, wax for example, designed to be coated with graphite, flake brass, or any other suitable electrically conductive coating material; or such as any suitable electrically conductive material, for example lead, bismuth, or any other suitable metal of low melting point. In the form shown in Fig. 1, the core 10 is provided with a tubular corrugated surface, the depressions 11 and elevations 12 of which are relatively wide and shallow. A tubular wall 13 of any suitable thickness is then formed by electrically depositing on said core any suitable metal, such as copper or nickle for example. This electro-deposition may be carried on in any suitable way known to the art of electro-depositing metals. Core 10 is then removed from said wall 13 in any suitable way, as by melting it out, and the electro-deposited blank is then subjected to cold-working operations to impart density and resilience thereto.

Figure 2:
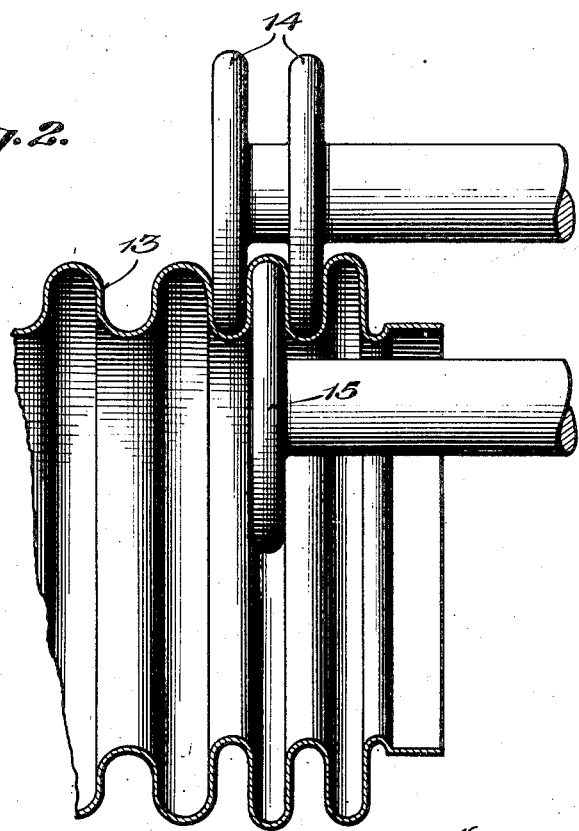
Fig. 2 is a schematic view illustrating one manner of cold-working a tubular corrugated wall such as would be formed on the core shown in Fig. 1.
Figure 3:
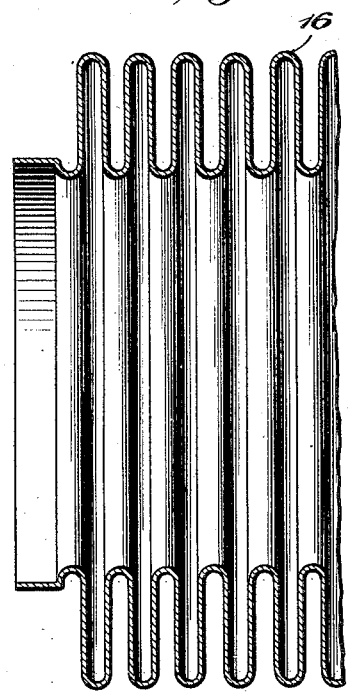
Fig. 3 shows an axial section of the completed flexible tubular corrugated wall.

Said wall may be cold-worked in any suitable way. As the corrugations of the blank, which are relatively wide and shallow, will ordinarily be narrowed and deepened so that the completed wall will have corrugations of the form shown in Fig. 3 for example, the blank may be sufficiently cold-worked by suitable operations which effect the deepening and narrowing of said corrugations. These latter operations may be carried out in any suitable way, as by rolling the wall between opposed sets of corrugating rolls 14 and 15 as illustrated in Fig. 2 and as described more particularly in my Patents Nos. 947,229 of January 25, 1910, and 971,838 of October 4, 1910. Said rolls 14 and 15 may be driven and mounted in any suitable way so that they may be brought into operative relation with the wall to be acted upon and are made of suitable dimensions in conformity with the shape to be imparted to the corrugations thereby, but in accordance with the process set out in my Patent No. 971,838, the wall is preferably subjected to a plurality of rolling operations which successively deepen and narrow the corrugations and impart different degrees of resiliency to the bends and lateral portions thereof. The resulting tubular corrugated wall 16 (see Fig. 3) has relatively deep and narrow corrugations in conformity with present commercial practice and, owing to the aforesaid cold-working operations, said wall possesses to a large extent the resiliency and density heretofore obtained in seamless tubular corrugated walls only by the protracted series of operations incident to the drawing of a wall from a sheet-metal blank and then corrugating the same.

Figure 4:
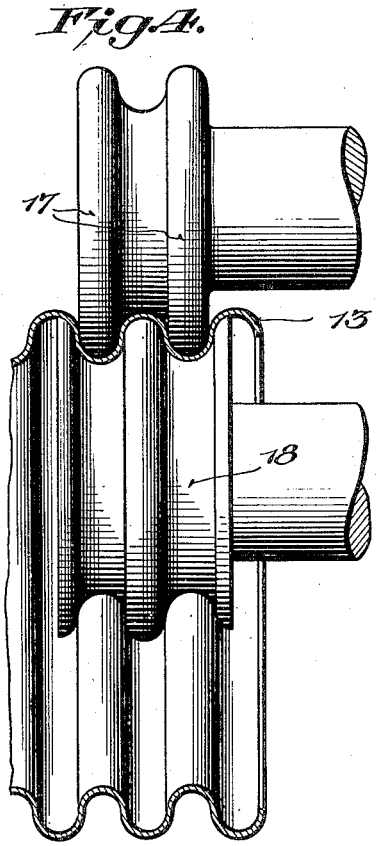
Fig. 4 is a schematic view showing how a tubular corrugated wall may be cold-worked prior to the operations which change the form of the corrugations.

In addition to the cold-working to which said wall is subjected by the operations which deepen and narrow the corrugations, said wall may be subjected at any suitable time in the course of its treatment to one or more cold-working operations which have for their purpose the imparting of resilience or density to said wall without changing the configuration of the corrugations. These operations also may be carried out in any suitable way. In the method illustrated in Fig. 4, the wall 13 is subjected to the rolling operation of coacting rolls 17 and 18 which have a configuration substantially the same as that of the corrugations of the original electro-deposited blank so that the said blank is cold-worked prior to changing the form of the corrugations. In place of subjecting the corrugated wall to such a cold-working operation prior to changing the form of the corrugations, said wall may be subjected to such a cold-working operation one or more times during the course of changing the form of the corrugations, or the corrugations in their completed form may be subjected to such a cold-working operation, by suitably shaping the rolls or other tools employed to conform with the shape of the corrugations at that step of the procedure. It is preferred to employ such cold-working operations prior to changing the form of the corrugations, however, as the wide and shallow character of the corrugations at this time facilitates access thereto while the tools required for cold-working at this stage of the procedure are more simple and less expensive. Moreover, while the rolls have been shown as so shaped as to engage all portions of the corrugated wall in the operation just described, it is to be understood that the rolls or other tools by which said wall is cold-worked may be so shaped as to operate only on certain portions of said wall, for example, on only the bends of the corrugations so as to impart additional resilience thereto. The different degrees of resilience imparted to the bends and lateral portions of the corrugations by narrowing and deepening the same in conformity with the method set out in my Patent No. 971,838 above identified, however, will ordinarily impart a sufficient gradation of resilience thereto.

Figure 5:
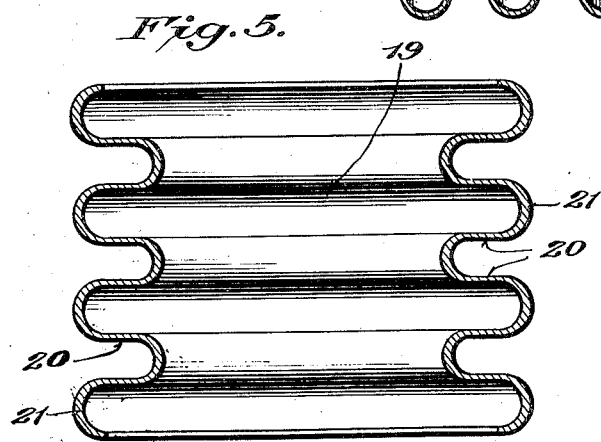
Fig. 5 shows an axial section of a tubular corrugated wall and illustrates how different portions of said wall may be made of different predetermined thicknesses.

It is sometimes desirable to provide flexible tubular corrugated walls of different degrees of thickness in different portions thereof. In my prior Patents Nos. 1,095,100 of April 28, 1914, 1,096,296 of May 12, 1914, and 1,270,402 of June 25, 1918, I have disclosed certain advantages to be obtained by making the bends of the corrugations thicker than the lateral portions thereof. On the other hand, I have disclosed in my Patent No. 1,523,951, granted January 20, 1925, certain advantages to be derived from making the bends of the corrugations thinner than the lateral portions thereof. The present invention facilitates the formation of the desired portions of the tubular corrugated wall of different thicknesses because, after the electrode-deposition has proceeded to that point at which the deposit is of the thickness desired for the thinner portions of the wall, they may be protected against further deposit of metal thereon, as by covering the same with varnish, shellac, or other suitable non-conductive coating material, and the electro-deposition may then be proceeded with until the desired thickness has been obtained for the thicker portions of the wall. Fig. 5 illustrates a tubular corrugated wall 19 in which the lateral portions 20 of the corrugations have been suitably protected from further deposition after reaching a predetermined thickness and the electro-deposition has then been proceeded with so that the bends 21 of said corrugations are thicker than said lateral portions. The blank so obtained by electro-deposition is then cold-worked in conformity with the present invention until the completed wall has imparted thereto the desired physical characteristics.

The present invention also facilitates the formation of an end wall integral with the tubular corrugated wall. In Fig. 8 is illustrated a tubular corrugated wall 22 provided with an end wall 23 integral therewith and formed by electro-deposition simultaneously with the formation of the tubular wall. This end wall may be made of the same thickness as the corrugated wall, or by protecting the corrugated wall from further deposit of metal when its desired thickness has been reached, the electro-deposition may be continued on the end wall until it has reached any desired thickness. It is to be understood that the blank so formed is then to be cold-worked in accordance with the present invention until the desired physical properties are imparted thereto.

While in the preferred embodiment of the invention the blank formed by electro-deposition is provided with relatively wide shallow corrugations, it is within the contemplation of my invention to form a cylindrical blank by electro-deposition and then cold-work the same in any suitable way to provide the desired corrugations therein, proceeding for example as disclosed in my prior Patent No. 971,838 and, if desired, subjecting said wall either before, during, or after the corrugating operations to additional operations designed to cold-work the metal without changing the form of the wall as above explained. The present invention also contemplates the manufacture of flexible tubular corrugated walls of electrically deposited metal in the shape of the completed wall and then subjecting the same to cold-working operations to impart the desired physical characteristics thereto, although this procedure lacks the facility of the preferred procedure, especially where the corrugations are relatively narrow and deep, because of the difficulty in getting into such relatively narrow and deep corrugations.

While the tubular corrugated blank may be formed on a core of material having a melting point below that of the metal of the wall so as to enable the core to be melted from the wall after the wall has been formed, I prefer to simplify and reduce the cost of operation of the method by providing permanent cores of suitable material that is strong and durable for handling, such as steel, which may be coated with graphite or any other suitable material to facilitate separation of the core from the deposited metal, and make said core collapsible so that it may be readily withdrawn from the completed wall. Such a core is illustrated in Figs. 6 and 7 and is shown as composed of four main sections 24, 25, 26, and 27. The sections 24 and 25 are of knockdown segmental form as illustrated so that the complementary sections 26 and 27 may be moved radially inward while the sections 24 and 25 are in operative position. These sections are nicely fitted together so as to provide a substantially smooth corrugated surface, although the cold-working to which the metal is subsequently subjected would eliminate any slight ribs that might result from the existence of joints in the core. The core sections are mounted on a cylindrical or slightly tapered mandrel 28 which prevents radially-inward displacement of the core sections and said sections are additionally provided with axial extensions 29 by which they are clamped in position on said mandrel in any suitable way, as by split rings 31 which may be tightened by screws 32, said clamping means preventing axial and radially-outward displacement of the core sections. After the wall has been formed on said core, the clamping rings 31 may be loosened, the mandrel 28 knocked out, the sections 26 and 27 pushed radially inward one after the other until free from the corrugated wall and removed axially, and then the sections 24 and 25 may likewise be knocked down and moved radially inward one after the other until free from the corrugated wall and removed axially.

It will therefore be perceived that a flexible tubular corrugated wall and method of making the same has been provided whereby such wall may be made of electro-deposited metal and yet possess all of the desirable physical characteristics, such as density and resilience with a relatively high limit of elasticity, such as heretofore obtained when said wall has been made by drawing a sheet-metal blank into tubular form and corrugating the same, but without involving the costly tools and number of operations incident to such a method of manufacture. At the same time the difficulties of securing a uniform deposit of metal incident to electro-deposition methods heretofore employed are avoided, together with the heavy wastage attendant on such methods, while, at the same time, the pliability and porosity which have constituted defects in electro-deposited tubular corrugated walls as heretofore made are eliminated. On the other hand, a method of manufacturing flexible tubular corrugated walls has been provided which facilitates the imparting of different degrees of resilience to different portions of its wall or different degrees of thickness to different portions of its wall or both, as well as enabling the formation of an end wall of any desired thickness integral with the tubular wall. Furthermore, the use of molds or cores with fragile, easily injured projections has been avoided and, at the same time, a permanent core has been provided which may be used repeatedly and readily collapsed for removal from the electro-deposited wall.

While certain embodiments of the invention have been described with considerable particularity, it is to be expressly understood that the invention is not restricted thereto as the same is capable of being carried out in a variety of ways, some of which will now readily suggest themselves to those skilled in the art, while certain features of the invention may be used without other features thereof. Reference is therefore to be had to the claims hereto appended for a definition of the limits of the invention.

What is claimed is:—

1. A method of making a flexible tubular corrugated wall which includes forming by electro-deposition a wall having corrugations therein and then deepening and narrowing said corrugations by working the metal.

2. A method of making a flexible tubular corrugated wall which includes forming by electro-deposition a wall having corrugations therein and cold-working said wall throughout to increase the density of the metal.

3. A method of making a flexible tubular corrugated wall which includes forming by electro-deposition a wall having corrugations therein and subjecting said corrugations to a rolling operation.

4. A method of making a flexible tubular corrugated wall which includes forming by electro-deposition a wall having corrugations therein, deepening and narrowing said corrugations, and at one or more stages of the procedure cold-working the same.

5. A method of making a flexible tubular corrugated wall which includes forming by electro-deposition a wall having relatively wide and shallow corrugations therein and working said corrugations to deepen and narrow the same.

6. A method of making a flexible tubular corrugated wall which includes forming by electro-deposition a corrugated wall having corrugations therein and cold-working the bends of said corrugations to impart resilience thereto.

7. A method of making a flexible tubular corrugated wall which includes forming by electro-deposition a wall having corrugations therein, deepening and narrowing said corrugations, and at one or more stages of the procedure cold-working the bends thereof to impart resilience thereto.

8. A method of making a flexible tubular corrugated wall which includes forming by electro-deposition a wall having corrugations therein, protecting portions of said wall from deposit of metal thereon, continuing the deposit on the other portions of said wall to increase the thickness thereof, and cold-working said corrugations.

9. A method of making a flexible tubular corrugated wall which includes forming by electro-deposition a wall having corrugations therein, protecting portions of said wall from deposit of metal thereon, continuing the deposit on the other portions of said wall to increase the thickness thereof, and deepening and narrowing said corrugations.

10. A method of making a flexible tubular corrugated wall which includes forming by electro-deposition a wall having corrugations therein, protecting portions of said wall from deposit of metal thereon, continuing the deposit on the other portions of said wall to increase the thickness thereof, and subjecting said corrugations to a rolling operation.

11. A method of making a flexible tubular corrugated wall which includes forming by electro-deposition a wall having corrugations therein and subjecting said corrugations to a cold-working operation.

12. A flexible tubular corrugated wall of electro-deposited metal which is thicker at portions of the corrugations than at other portions thereof.

13. A flexible tubular corrugated wall of electro-deposited metal which is resilient.

14. A method of making a flexible tubular corrugated wall, which includes forming by electro-deposition a wall having corrugations therein, deepening and narrowing said corrugations, and at one or more stages of the procedure subjecting the corrugations to a rolling operation.

15. A method of making a flexible tubular corrugated wall, which includes forming by electro-deposition a wall having relatively broad and shallow corrugations therein, subjecting the metal of said wall to a cold-working operation at one or more stages of the procedure, and deepening and narrowing said corrugations.

16. A method of making a flexible tubular corrugated wall, which includes forming by electro-deposition a wall having corrugations therein, deepening and narrowing said corrugations, and at one or more stages of procedure subjecting the metal of the wall to a cold-working operation without changing the shape of the corrugations.

In testimony whereof I have signed this specification.

WESTON M. FULTON.